May 22, 1956 R. C. ABBETT 2,747,029

RADIO FREQUENCY AMPLIFIER SYSTEM

Filed May 7, 1953

INVENTOR.
Roy C. Abbett

BY Charles H. Brown
ATTORNEY

United States Patent Office 2,747,029

Patented May 22, 1956

2,747,029

RADIO FREQUENCY AMPLIFIER SYSTEM

Roy Chester Abbett, Audubon, N. J., assignor to Radio Corporation of America, a corporation of Delaware Application May 7, 1953, Serial No. 353,500

4 Claims. (Cl. 179—171)

This invention relates to radio frequency distribution systems, and particularly pertains to the amplification of a number of radio frequency signals induced in one or more antennas and occurring over a wide frequency band which are amplified and applied to a number of receivers, as for example in master antenna systems for the reception and distribution of television and frequency modulation broadcast signals.

It is an object of this invention to provide an improved amplifier system for master antenna and distribution systems having improved signal-to-noise characteristics.

Another object of the invention is to provide an amplifier system for use with master antenna systems in which a high degree of amplification is attained, and in which flatness of response and freedom from intermodulation distortion is obtained.

A further object of this invention is to provide an amplifier unit which may be used as a master amplifier, a bridging amplifier, or a repeater amplifier in master antenna and distribution systems which enables fewer amplifier units to be used, permits longer cable runs from one amplifier to the next, and which provides an improved signal to each of the receivers connected to the system.

These and other objects of the invention are achieved by an amplifier arrangement which utilizes a combination of broadband and channelized amplifiers to afford a system having the good features of both, and essentially none of the disadvantages of either. The incoming radio frequency signal is applied directly to a broadband amplifier. The broadband amplifier has comparatively low gain and amplifies all of the signals in the band of frequencies to be distributed by a fairly uniform amount. The output of the broadband amplifier is connected to a voltage dividing network which divides the incoming broadband radio frequency signal equally without change in response characteristics between a number of narrow band high gain channelized amplifiers. The outputs of the severial channelized amplifiers are recombined and applied to the transmission line which extends to each of the several receivers being served by the master antenna and distribution system.

Figure 1:
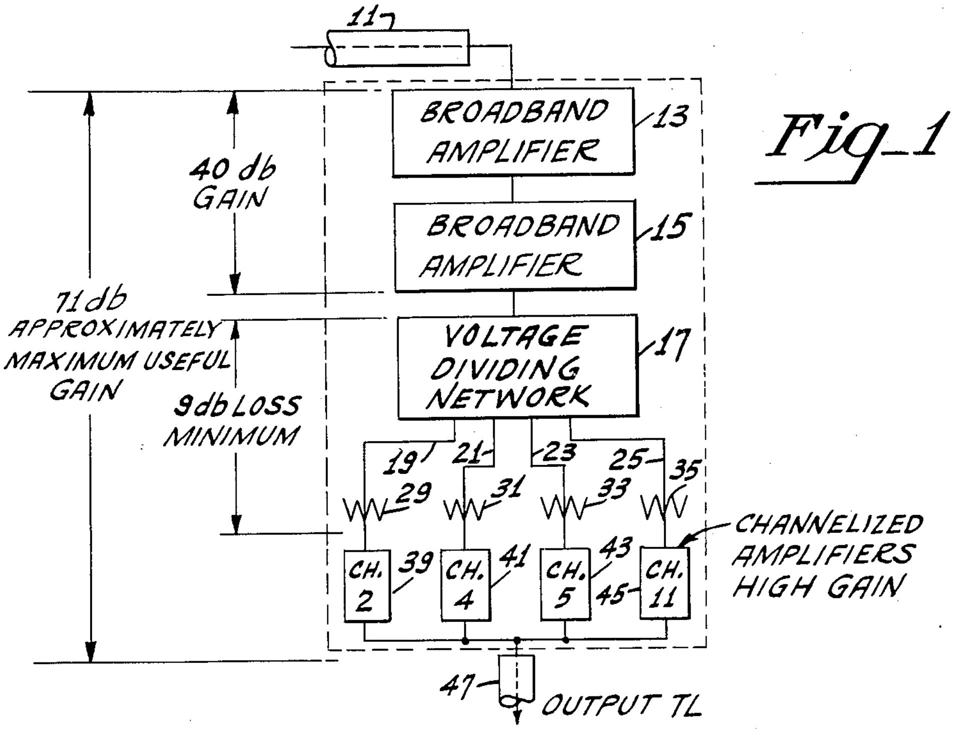
Figure 2:
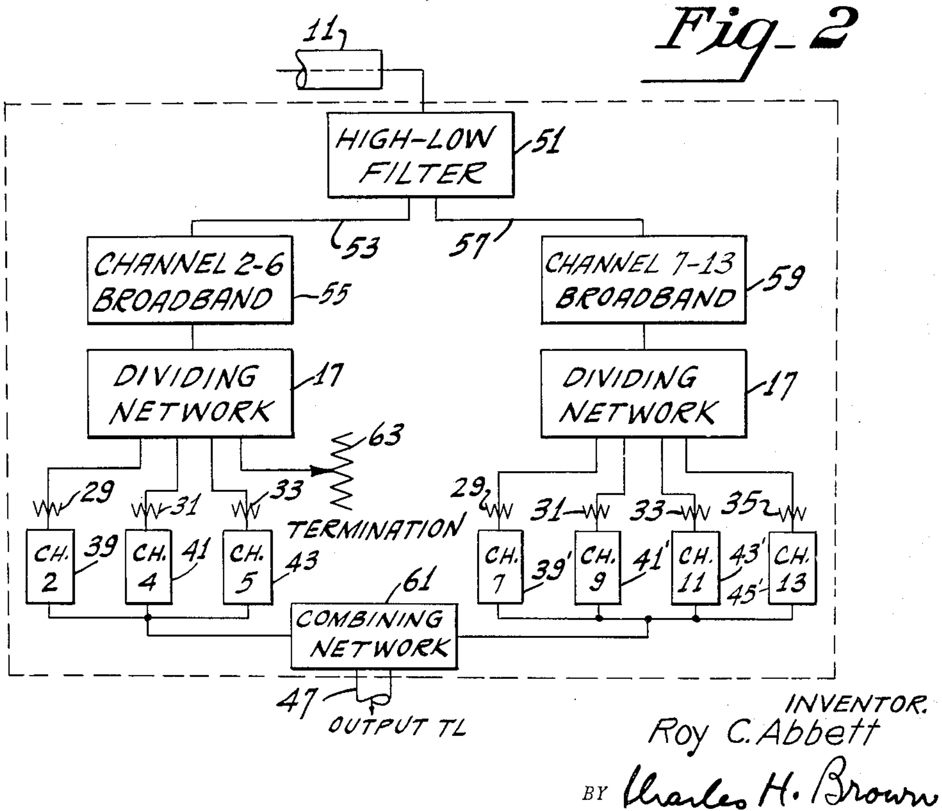

A more detailed description follows in conjunction with the accompanying drawing, wherein:

Figure 1 shows an amplifier system in accordance with the present invention; and Figure 2 shows another amplifier system utilizing the principles of this invention.

Referring to Figure 1, there is shown an input transmission line 11 to bring the broadband radio frequency signals from a suitable receiving antenna (preferably directive in character) to the distribution amplifiers. The radio frequency signals from the transmission line 11 are fed to a broadband amplifier 13 having comparatively low gain characteristics and a substantially flat response over the entire band of radio frequencies to be distributed. The output of this first broadband amplifier 13 is preferably fed to a second broadband amplifier 15 also having comparatively low gain and extremely flat response over the band of frequencies used. A representative figure for the gain of broadband amplifiers of the type which it is contemplated will be used in practicing this invention is for example 20 db. Not more than about 40 db can be accommodated without intermodulation distortion, poor linearity, and unequal signal levels of the various radio frequency signals at the output. Furthermore, broadband amplifiers are limited to applications requiring only low power output characteristics.

After the radio frequency signals have been amplified in the broadband amplifiers 13 and 15, they are then divided among a plurality of output lines by a suitiable voltage dividing network 17 and fed to different transmission lines 19, 21, 23 and 25. A voltage dividing network which may be used in box 17 of the drawing may comprise resistive voltage dividers or tightly coupled bifilar transformers or transmission coils having a single input and four isolated outputs. These individual transmission lines 19, 21, 23 and 25 are connected through resistive isolation networks or adjustable resistive pads 29, 31, 33 and 35, each one of which is individual to one of the associated transmission lines and forms a part of the input circuit of high gain channelized amplifiers. These networks or pads are shown diagramatically, but it will be understood that they are conventional T, L or H type resistive pads having input and output terminals. In Figure 1 four such high gain channelized amplifiers 39, 41, 43 and 45 are shown and they are indicated as being tuned to the very high frequency television channels numbered 2, 4, 5 and 11, respectively.

Each of the channelized amplifiers is a comparatively narrow band amplifier device having very high gain, high power output, essentially no intermodulation distortion, and high stability in operation. The level of signal at the output of the several channelized amplifiers 39, 41, 43 and 45 is adjusted, in operation, to the proper value by choosing the values of resistance in the attenuator networks 29, 31, 33 and 35.

The output of the several channelized amplifiers 39, 41, 43 and 45 is combined and fed to the output transmission line 47 which extends to a plurality of receivers (not shown) utilizing the radio frequency signals.

It is particularly important in master antenna and distribution systems for television and frequency modulation broadcasts to maintain the signal-to-noise ratio as high as possible. The broadband amplifiers 13 and 15 are used to amplify the signal before it is reduced in level by the voltage dividing network. The noise in amplifier systems used for the purposes mentioned is mainly composed of noise arising in the lowest level amplification stage. Therefore, if the signal is divided before amplification, the noise which is inherent in the lowest level amplification stage of the amplifier has a higher value relative to the strength of the radio frequency signal. The system of this invention avoids the lossy voltage division and isolation process until the amplitude of the incoming R. F. signals has been sufficiently increased in the broadband amplifier stage to provide for more than the loss in the voltage division and isolation steps.

The flexibility if the amplification system of the invention provides a means of amplifying a plurality of incoming signals of widely different strengths to substantially identical levels by the use of the isolation and attentuator networks 29, 31, 33 and 35. The need for such flexibility in the commercial installation can be appreciated when it is realized that the incoming signal strengths, for example from close by and remotely located television broadcasting stations, may vary over wide limits.

Referring now to Figure 2, there is shown another arrangement of the amplifier system of the invention which uses two separate broadband amplifiers for very high frequency television applications. If the incoming radio frequency signals are collected by a single antenna or are collected by separate antennas and combined on a single transmission line, they are separated into the low band from 54 to 88 megacycles and the high band from 174 to 216 megacycles by a high pass-low pass filter 51. Such filters are well known in the art and may consist of, for example, half-section or full-section M-derived or constant-K filters having negligible attenuation (less than 1 db) over the pass band with very high attenuation (of the order of 40 or 50 db) over the stop band. The low band output of the filter is connected through a transmission line 53 to a low band (channels 2 to 6) broadband amplifier 55. The signals are amplified in the broadband amplifier 55 and are then applied to a voltage dividing network 17 in the same manner as the all-band signals of Figure 1. The divided signal is then fed through attenuator networks 29, 31 and 33 to separate high gain channelized amplifiers 39, 41 and 43 like those of Figure 1. The high band radio frequency signals from the high frequency output of the high-low filter 51 are fed over a separate line 57 to a high band broadband amplifier 59 which amplifies the very high frequency channels 7 through 13 in the same manner as the broadband amplifiers 13 and 15 of Figure 1. The output of the broadband amplifier 59 is then divided in voltage by a dividing network 17 and fed through attenuator networks 29, 31, 33 and 35 to each of the channel amplifiers 39', 41', 43' and 45', which are tuned to the individual channels to be amplified and distributed.

The high and low band signals are then combined in a combining network 61 which preferably provides isolation between the high band and low band amplifiers. Such a combining network 61 may be, for example, a high-low-pass filter arrangement similiar to that described for the high-low filter 51. The arrangement of Figure 2 is particularly useful in areas where a number of television channels are received, such as for example where channels 2, 4, 5, 7, 9, 11 and 13 are available.

It will be noticed that the voltage dividing network 17 for the low band (channels 2 through 6) portion of Figure 2 contains a termination 63 for a fourth output, such as will be present when two bifilar transmission coils are used to give equal broadband voltage division between four output lines.

The amplifier unit of the invention may be used as a master amplifier, a bridging amplifier, or a repeater amplifier in master antenna and distribution systems. Since the improved amplification system results in at least 9 db improvement in the signal-to-noise characteristics, fewer amplifier units can be used in a given system to provide the same or higher inputs signals to the numerous receivers being served. Furthermore, in repeater and bridging amplifier application, longer cable runs are permissible from one amplifier to the next, since the signal-to-noise ratio is a main limiting factor in how far apart amplifiers may be spaced for repeater applications. For example, the RG-11/U cable which can be used in the distribution system has approximately 2 db per hundred feet attenuation at 100 megacycles. By providing an improvement of 9 db in the signal-to-noise ratio, a cable run of 450 feet longer may be permitted, with the same signal-to-noise ratio being preserved.

Although it is contemplated that the main use of the invention will be in connection with master antenna and distribution systems, the principles of the invention are applicable to other uses as well.

What is claimed is:

1. In the field of receiving and distributing radio frequency signals occurring over a very wide band of frequency, an amplifier system including a relatively low-gain broadband amplifier capable of amplifying a band of frequencies having a wide frequency range of the order of four-to-one directly coupled to a source of such signals, a voltage divider network coupled to the output of said broadband amplifier and having a plurality of outputs, separate high-gain channel amplifiers coupled to each of said plurality of outputs from said voltage divider network, and means to combine the output signals from said separate channel amplifiers.

2. In the field of receiving and distributing radio frequency signals occurring over a very wide band of frequencies, an amplifier system for a source of low-amplitude broadband signals including an amplifier having low intermodulation distortion, comparatively low gain and capable of amplifying a band of frequencies with substantially flat response over a frequency range of the order of four-to-one directly coupled to a source of such signals, a voltage divider network coupled to the output of said broadband amplifier and having a plurality of outputs, separate high-gain channel amplifiers individually coupled to each of said plurality of outputs from said voltage divider network, and means to combine the output signals from said separate channel amplifiers.

3. In the radio frequency television signal and distribution field, an amplifier system including a signal frequency separation filter adapted to be connected to a source of broadband signals and having at least two outputs, two broadband amplifiers directly coupled to the respective outputs of said filter, two voltage divider networks coupled to the respective outputs of said broadband amplifiers and having a plurality of outputs, separate high-gain channel amplifiers coupled to each of said plurality of outputs from said voltage divider networks, and means to combine the output signals from said separate channel amplifiers.

4. In a master antenna system for receiving, amplifying and distributing a plurality of television channel signals, the combination of, a relatively low gain broadband amplifier capable of amplifying all of said channel signals, a voltage divider resistance pad coupled to the output of said broadband amplifier and having a plurality of outputs, separate high gain channel amplifiers coupled to each of said plurality of outputs from said resistance pads, said channel amplifiers each having an effective frequency range limited to that of one of said channel signals, and means to combine the output signals from all of said channel amplifiers.

References Cited in the file of this patent

UNITED STATES PATENTS

| | | |
|---|---|---|
| 2,068,685 | Lansing | Jan. 26, 1937 |
| 2,195,152 | Roux et al. | Mar. 26, 1940 |
| 2,558,868 | McCarty | July 3, 1951 |

OTHER REFERENCES

Wide-Band Chain Amplifier for T. V. by W. V. Tyminski, published in Radio and Television News, Engineering Section, April 1950, vol. 43, No. 4, pages 14–16 and 29.

How T. V. Came to Panther Valley by E. D. Lucas, Jr., published in Radio and Television News, March 1951, vol. 45, No. 3, pages 31–34, 106, 108 to 111.